United States Patent
Ansari et al.

(10) Patent No.: US 12,501,408 B2
(45) Date of Patent: Dec. 16, 2025

(54) METHOD FOR PERFORMING RESOURCE SELECTION FOR TRANSMISSION, BY A USER EQUIPMENT, UE, IN A TELECOMMUNICATION NETWORK, AS WELL AS THE CORRESPONDING UE AND A RELATED COMPUTER PROGRAM PRODUCT

(71) Applicant: Telefonaktiebolaget LM Ericsson (publ), Stockholm (SE)

(72) Inventors: Junaid Ansari, Aachen (DE); Jose Angel Leon Calvo, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 314 days.

(21) Appl. No.: 18/547,091

(22) PCT Filed: Feb. 23, 2021

(86) PCT No.: PCT/EP2021/054373
§ 371 (c)(1),
(2) Date: Aug. 18, 2023

(87) PCT Pub. No.: WO2022/179674
PCT Pub. Date: Sep. 1, 2022

(65) Prior Publication Data
US 2024/0155569 A1    May 9, 2024

(51) Int. Cl.
*H04W 72/02* (2009.01)
*H04W 72/40* (2023.01)
(Continued)

(52) U.S. Cl.
CPC ........... *H04W 72/02* (2013.01); *H04W 72/40* (2023.01); *H04W 72/51* (2023.01); *H04W 88/04* (2013.01)

(58) Field of Classification Search
CPC ...... H04W 72/02; H04W 72/51; H04W 72/40
See application file for complete search history.

(56) References Cited

U.S. PATENT DOCUMENTS

| | | |
|---|---|---|
| 2016/0004871 A1 | 1/2016 | Guedalia et al. |
| 2019/0261171 A1 | 8/2019 | Cozzetti |
| 2023/0309134 A1* | 9/2023 | Leon Calvo ........ H04W 72/563 |

OTHER PUBLICATIONS

AT&T, "V2X sidelink design in supporting unicast, groupcast and broadcast", 3GPP TSG RAN WG1 Meeting #94, R1-1809066, Gothenburg, Sweden, Aug. 20-24, 2018, 1-5.

(Continued)

*Primary Examiner* — Won Tae C Kim
(74) *Attorney, Agent, or Firm* — Sonoda & Kobayashi Intellectual Property Law; Sarvajit S. Patil

(57) ABSTRACT

A method for performing resource determination for transmission, by a User Equipment, UE, in a telecommunication network, wherein said method comprises the steps of receiving, by said UE, from at least one UE in said telecommunication network, a resource coordination message in device-to-device, D2D, based transmissions, wherein said resource coordination message comprises a resource information to be taken into account by said UE when determining resources for transmission, determining, by said UE, a trustworthiness value for each of said at least one UE separately, wherein said trustworthiness value indicates a trustworthiness of a particular UE and determining resources for said transmission based on said resource information and said determined trustworthiness value for each of said at least one UE separately.

13 Claims, 4 Drawing Sheets

(51) Int. Cl.
*H04W 72/51* (2023.01)
*H04W 88/04* (2009.01)

(56) References Cited

OTHER PUBLICATIONS

Ericsson, "Resource allocation mechanisms for power saving", 3GPP TSG-RAN WG1 Meeting #104-e, R1-2100687, e-Meeting, Jan. 26-Feb. 5, 2021, 1-16.
LG Electronics, "Discussion on resource allocation for NR sidelink Mode 2", 3GPP TSG RAN WG1 #97, R1-1907014, Reno, USA, May 13-17, 2019, 1-11.

* cited by examiner

METHOD FOR PERFORMING RESOURCE SELECTION FOR TRANSMISSION, BY A USER EQUIPMENT, UE, IN A TELECOMMUNICATION NETWORK, AS WELL AS THE CORRESPONDING UE AND A RELATED COMPUTER PROGRAM PRODUCT

FIELD OF THE INVENTION

The present invention is related to the field of resource selection for a User Equipment, UE, that is active in Device-to-Device, D2D, communications with other UE.

BACKGROUND

3GPP specified an Long Term Evolution, LTE, Device-to-Device, D2D, also known as ProSe, Proximity Services, in the Release 12 and 13 of LTE. Later in Rel-14 and Rel-15, LTE Vehicle-to-everything, V2X, related enhancements targeting the specific characteristics of vehicular communications were specified. 3GPP has started a new work item, WI, in August 2018 within the scope of Rel-16 to develop a New Radio, NR, version of V2X communications.

The NR V2X mainly targets advanced V2X services, which can be categorized into four use case groups: vehicles platooning, extended sensors, advanced driving and remote driving. The advanced V2X services would require enhanced NR system and new NR sidelink to meet stringent requirements in terms of latency and reliability. NR V2X system also expects to have higher system capacity and better coverage and to allow for easy extension to support the future development of further advanced V2X services and other services.

Given the targeted services of NR V2X, it is commonly recognized that groupcast/multicast and unicast transmissions are desired, in which the intended receiver of a message consists of only a subset of the vehicles in proximity to the transmitter, called groupcast, or of a single vehicle, called unicast. For example, in the platooning service there are certain messages that are only of interest to the member of the platoon, making the members of the platoon a natural groupcast.

In another example, the see-through use case most likely involves only a pair of vehicles, for which unicast transmissions naturally fit. Therefore, NR sidelink can support broadcast, as in LTE, groupcast and unicast transmissions. Furthermore, NR sidelink is designed in such a way that its operation is possible with and without network coverage and with varying degrees of interaction between the user equipment, UE2, and the telecommunication network, including support for standalone, "network-less" operation.

In 3GPP, Rel-17 discussions are starting and Public Safety, PS, is considered to be one of the main use cases which can benefit from the already developed NR sidelink. Therefore, it is most likely that 3GPP will specify enhancements related to PS use case taking NR Rel. 16 sidelink as a baseline.

For sidelink transmission, each packet transmitted via the Physical Layer Shared Channel, PSSCH, is associated with a Sidelink Control Information, SCI, via Physical Layer Control Channel, PSCCH. For NR SL, SCI contains at least the following information to enable successful decoding and proper treatment at the receiver UE:

The associated PSSCH resources;
DMRS pattern;
L1 source and destination ID;
Zone ID;
Required communication range;
Priority;

In NR SL, different physical sidelink channels are defined.

Physical sidelink control channel, PSCCH: This is used to carry (part of) sidelink control information, SCI, which is also termed as 1st stage SCI. 1st stage SCI carries the resource allocation information which is essential to decode transmissions for performing sensing-based resource allocation (i.e., mode-2) including the scheduling information.

Physical sidelink shared channel, PSSCH: This is used to carry actual data transmission. Also, a part of SCI, also termed as 2nd stage SCI, is carried over PSSCH.

Physical sidelink feedback channel, PSFCH: This is used to carry the HARQ feedback information such as HARQ-ACK or HARQ-NACK. In Rel-16, only sequence based PSFCH is supported.

Physical sidelink broadcast channel, PSBCH: This is used to carry the system information which is used to perform sidelink transmissions including synchronization information.

In the traditional specific PS communication systems such as TETRA, the data rates were in the order of a few kbit/s at most, which do not provide support for the foreseen PS use case scenarios. Moreover, the PS use case requires enhanced coverage and high reliability for its communications. Therefore, PS is a particularly interesting case for NR since it can provide the required robustness in the communications and the ability to communicate even in the cases where a fixed infrastructure is not installed.

Some of the deployment scenarios where PS communications have no support from infrastructure are such as tunnels, inside some buildings or in emergency situations where the infrastructure is destroyed, non-existing or non-operative. Even though in some of these cases, cellular coverage can be provided using some mobile stations, i.e., trucks with a portable base station installed therein, the implementation of sidelink communications can be highly beneficial in PS. Among the requirements for PS, one main topic is the group communication for PS in cases such as, a group of workers in a building.

The scenarios which are considered for PS include in-coverage scenarios where network, eNB/gNB, is available and out-of-coverage scenarios where there is no infrastructure. For the out-of-coverage scenario, the addition of sidelink for synchronization and communication among the users is foreseen, however, the inclusion of multi-hop sidelink has not been done in legacy communication systems.

In this framework, a transmitting, Tx, UE receives a resource coordination message, with or without previously sending an enquiry message, to boost/improve its own resource selection. Based on the resource coordination message, the Tx UE then performs resource (re-)selection. That is, considering the information a UE receives in the coordination message, it selects the (optimum) resource(s) for its own transmission.

In case the UE has already selected the resource(s), it may either keep the same resource(s) as selected previously in case it is still considered suitable for transmission or selects another resource(s) in case the earlier selected resource(s) is (are) not suitable for transmission based on the received coordination message.

Moreover, the coordination message can either comprise a set of resources, for example a resource map indicating suitable/unsuitable resources, which is referred as Map-based coordination message or a flag, for example a one-bit signal, indicating the UE to perform a re-selection of the resources selected for transmission which is referred to as flag-based coordination message.

In the current specification for NR SL the following procedures/mechanisms are missing or not applicable:

In NR SL, the resource pools are defined as shared. Different UEs with potentially different capabilities use the resource pool without appropriate coordination mechanism causing interference and packet collisions leading to resource wastage, undesired latency and power consumption.

Resource usage suggestion from other nodes, i.e., inter-UE coordination mechanism, can be used by the receiving, Rx, UE but without any streamlined/systematic/methodological criteria from the transmitting/receiving, Tx/Rx, UE perspective, the resource use suggestion from different UEs may lead to suboptimal and even counter-productive decisions—resulting in inefficient resource usage.

Without having a scheme to rank and select the resource usage from other nodes, a given UE may resort to select the latest arriving suggestion, but this is often not optimal. Moreover, multiple resource usage suggestions coming from different nodes could be contradicting creating a non-consistent procedure at the Tx/Rx UE without proper rules.

LG ELECTRONICS: "Discussion on resource allocation for NR sidelink Mode 2", 3GPP DRAFT; R1-1907014 DISCUSSION ON RESOURCE ALLOCATION FOR NR SIDELINK MODE 2, 3rd Generation Partnership Project (3GPP), Mobile Competence Centre; 650, Route des Lucioles; F-06921 Sophia-Antipoli, vol. RAN WG1, no. Reno, USA; 20190513-20190517 May 2019 discloses an assisting UE indicating a subset of resources and a UE receiving the assistance information can limit its resource selection to the indicated resource subset.

US2016/004871 A1 discloses a method for incrementally sharing increasing amounts of information between two or more user devices, based on the trust level between two devices.

SUMMARY

It is an objective of the present disclosure to provide for an improved scheme for determining the resource for transmission by a UE that is capable of Device-to-Device, D2D, based transmissions.

In a first aspect of the present disclosure, there is provided a method for performing resource determination for transmission, by a User Equipment, UE, in a telecommunication network, wherein said method comprises the steps of:

receiving, by said UE, from at least one UE in said telecommunication network, a resource coordination message in device-to-device, D2D, based transmissions, wherein said resource coordination message comprises a resource information to be taken into account by said UE when determining resources for transmission;

determining, by said UE, a trustworthiness value for each of said at least one UE separately, wherein said trustworthiness value indicates a trustworthiness of a particular UE;

determining resources for said transmission based on said resource information and said determined trustworthiness value for each of said at least one UE separately.

It was the insight of the inventors that a trustworthiness value or metric may be introduced to the UEs that provide the resource information, for example resource suggestion, in a corresponding resource coordination message. This may be implemented as a metric explicitly or implicitly associated to the resource suggestion comprised by the resource coordination message such that the receiving UE is able to make an informed decision for an improved resource selection, which leads to an increased network resource utilization efficiency.

The trustworthiness value may be sent explicitly and/or associated to the resource coordination message or inferred implicitly. In particular examples of the present disclosure, details of several mechanisms and/or procedures are described based on which the trustworthiness value may be derived.

Following the above, the trustworthiness value may be considered a measure for the trustworthiness of the suggested resources comprised by the corresponding resource coordination message.

One of the advantages of the presented method is that the UE may take an informed decision on what resources to use for transmission. The UE may use one of the suggested resources or may, based on the trustworthiness value, determine a further, not-suggested, resource by considering the received resource information. The above may lead to higher spectral efficiency, an improved Quality-of-Service, QoS, and a lower number of collisions or conflict situations.

The trustworthiness value is determined, for example derived or calculated, from the corresponding received coordination message and may be used to rank and/or assess the significance of the resource usage suggestion from the one or more UEs sending the coordination message. The trustworthiness value may comprise both temporal and spatial aspects which is described in more detail later below.

The trustworthiness value for a particular UE may be determined or assess based on the actual utilization of resources or trustworthiness based on the capability, role or the hierarchy of the UE sending the information.

Following the explanation above, it is noted that the trustworthiness values may aid a UE in determining which resource, for example which suggested resource, to use for its transmission. The trustworthiness value may also be considered as an intrinsic value for the corresponding suggested resource, i.e. how much or to what extend the UE is to take into account the trustworthiness value for the UE.

The above described method is based on the concept that multiple UEs are in the neighbourhood of each other, and that they are able to contact each other via Device-to-Device, D2D, communication for example by using New Radio, NR, sidelink or Long Term Evolution, LTE, sidelink based communications.

Following the above, the inventors noted that resource coordination message comprises a resource information to be taken into account by said UE when determining resources for transmission. Such a resource information may comprises a resource suggestion for the UE to use for its transmission or may, for example, be related to their own resource occupancy that the UE can take into account when determining the resource it should use for transmission.

In an example, predefined trustworthiness values are allocated based on different types of UEs, and wherein the step of determining comprises:

determining, by said UE, said trustworthiness value for each of said at least one UE separately by determining the type of UE for each of the at least one UE separately.

The inventors have noted that certain type of UEs may be considered higher in rank compared to more regular UEs, such that the information that is received from a UE that is higher in rank is to be considered more valuable compared to information received from other UE. One example is directed to network nodes in the telecommunication network, for example master nodes in the telecommunication network. It may be determined that nodes in the telecommunication network have a higher rank compared to more regular UE such that the trustworthiness value determined from coordination messages received from a network node in the telecommunication network is ought to have more value compared to those received from other UE.

In a further example, predefined trustworthiness values are allocated based on UE capabilities, and wherein the step of determining comprises:
    determining, by said UE, said trustworthiness value for each of said at least one UE separately by determining UE capabilities for each of the at least one UE separately.

That is, UEs with higher capabilities may have a higher trustworthiness value or trustworthiness ranking compared to UEs that have lower capabilities.

In another example, the step of determining comprises:
    receiving, by said UE, from a base station in said telecommunication network, predefined trustworthiness values for each of said at least one UE separately.

It may be decided that the trustworthiness values are coordinated centrally, for example by the telecommunication network. In such case, the UE may receive the trustworthiness values from a base station in the telecommunication network.

In a further example, the step of determining the trustworthiness value comprises determining said trustworthiness value for each of said at least one UE separately based on any of:
    a sensing interval used for determining said suggested resource to be used by said UE for said transmission;
    position of corresponding UE, received signal strength, beam direction and/or beam width associated with said corresponding received resource coordination message;
    time between spectrum sensing information used for determining said suggested resource to be used by said UE for said transmission and time of receiving said corresponding resource coordination message;
    UE capability;
    role of said UE in said telecommunication network.

The above described example provides for specific examples of information that may be used by the UE when determining the actual trustworthiness value for a particular UE.

In another example, the step of determining said trustworthiness value comprising:
    calculating, by said UE, for each of said at least one UE said trustworthiness value by summing individual weights, wherein said individual weights are based on any of:
        proximity or location of the corresponding UE;
        signal strength from the corresponding UE;
        a metric to represent capability and/or sensing accuracy of the corresponding UE;
        a factor representing an inverse of the duration when a last resource coordination message of said corresponding UE was received;
        inverse of an occupancy rate of resources;
        assigned hierarchy in said telecommunication network of said corresponding UE.

It was found that the trustworthiness value may be based on a plurality of weights, i.e. may be the sum of a plurality of weights. The sum may be normalized such that the trustworthiness value is a score somewhere between zero and one. The weights for each parameter may be predefined or may be variable during operation. In any case, the trustworthiness value may be the sum of the individual weights, wherein the individual weights are based on a plurality of parameters, wherein examples are provided above.

In a further example, each resource coordination message comprises a suggested resource for use for said transmission, wherein said step of determining said resources for transmission comprises:
    selecting said one of said received suggested resources for said transmission by determining that said calculated trustworthiness value exceeds a current, a pre-defined, a configurable and/or an empirically determined, trustworthiness value.

Finally, the UE is arranged to select one of received suggested resource for the transmission by determining that a particular calculated trustworthiness value exceeds a current trustworthiness value.

That is, the UE may, previously, have determined resources to use for its transmission, wherein the previously determined resources may be accompanied with a trustworthiness value. Once the newly determined trustworthiness value for a different suggested resource exceeds the trustworthiness value of the previously determined trustworthiness value, it may be decided to transition to the different suggested resource.

In a second aspect of the present disclosure, there is provided a User Equipment, UE, arranged for performing resource determination for transmission in a telecommunication network, wherein said UE comprises:
    receive equipment arranged for receiving from at least one UE in said telecommunication network, resource coordination messages in device-to-device, D2D, based transmissions, wherein each resource coordination message comprises a resource information to be taken into account by said UE when determining resources for transmission;
    process equipment arranged for determining a trustworthiness value for each of said at least one UE separately, wherein said trustworthiness value indicates a trustworthiness of a particular UE;
    determine equipment arranged for determining resources for said transmission based on said resource information and said determined trustworthiness value for each of said at least one UE separately.

It is noted that the advantages as discussed and explained with respect to the examples of the first aspect, being the method for selecting a resource to use for transmission by a UE, are also applicable to the examples of the second aspect, being the UE arranged for selecting a resource to use for transmission.

In an example, predefined trustworthiness values are allocated based on different types of UEs, and wherein the determine equipment is further arranged for determining said trustworthiness value for each of said at least one UE separately by determining the type of UE for each of the at least one UE separately.

In a further example, predefined trustworthiness values are allocated based on UE capabilities, and wherein the process equipment is further arranged for determining said trustworthiness value for each of said at least one UE separately by determining UE capabilities for each of the at least one UE separately.

In another example, the equipment is further arranged for receiving from a base station in said telecommunication network, predefined trustworthiness values for each of said at least two UE separately.

In a further example, said process equipment is further arranged for determining said trustworthiness value for each of said at least one UE separately based on any of:
- a sensing interval used for determining said suggested resource to be used by said UE for said transmission;
- position of corresponding UE, received signal strength, beam direction and/or beam width associated with said corresponding received resource coordination message;
- time between spectrum sensing information used for determining said suggested resource to be used by said UE for said transmission and time of receiving said corresponding resource coordination message;
- UE capability;
- role of said UE in said telecommunication network.

In an example, the process equipment is further arranged for:
- calculating for each of said at least one UE said trustworthiness value by summing individual weights, wherein said individual weights are based on any of:
  - proximity or location of the corresponding UE;
  - signal strength from the corresponding UE;
  - a metric to represent capability and/or sensing accuracy of the corresponding UE;
  - a factor representing an inverse of the duration when a last resource coordination message of said corresponding UE was received;
  - inverse of an occupancy rate of resources;
  - assigned hierarchy in said telecommunication network of said corresponding UE.

In a further example, each resource coordination message comprises a suggested resource for use for said transmission, wherein said determine equipment is further arranged for:
- selecting said one of said received suggested resources for said transmission by determining that said calculated trustworthiness value exceeds a current, a pre-defined, a configurable and/or an empirically determined, trustworthiness value In a third aspect of the present disclosure, there is provided a computer program product comprising a computer readable medium having instructions stored thereon which, when executed by a User Equipment, UE, in a telecommunication network, cause said UE to implement a method in accordance with any of the method examples as provided above.

It is noted that the advantages as discussed and explained with respect to the first aspect of the present disclosure are also applicable to the aspects of the third aspect of the present disclosure, being the computer program product.

The expressions, i.e. the wording, of the different aspects comprised by the User Equipment, UE, the method and the UE according to the present disclosure should not be taken literally. The wording of the aspects is merely chosen to accurately express the rationale behind the actual function of the aspects.

The above-mentioned and other features and advantages of the invention will be best understood from the following description referring to the attached drawings. In the drawings, like reference numerals denote identical parts or parts performing an identical or comparable function or operation.

DETAILED DESCRIPTION

Figure 1:
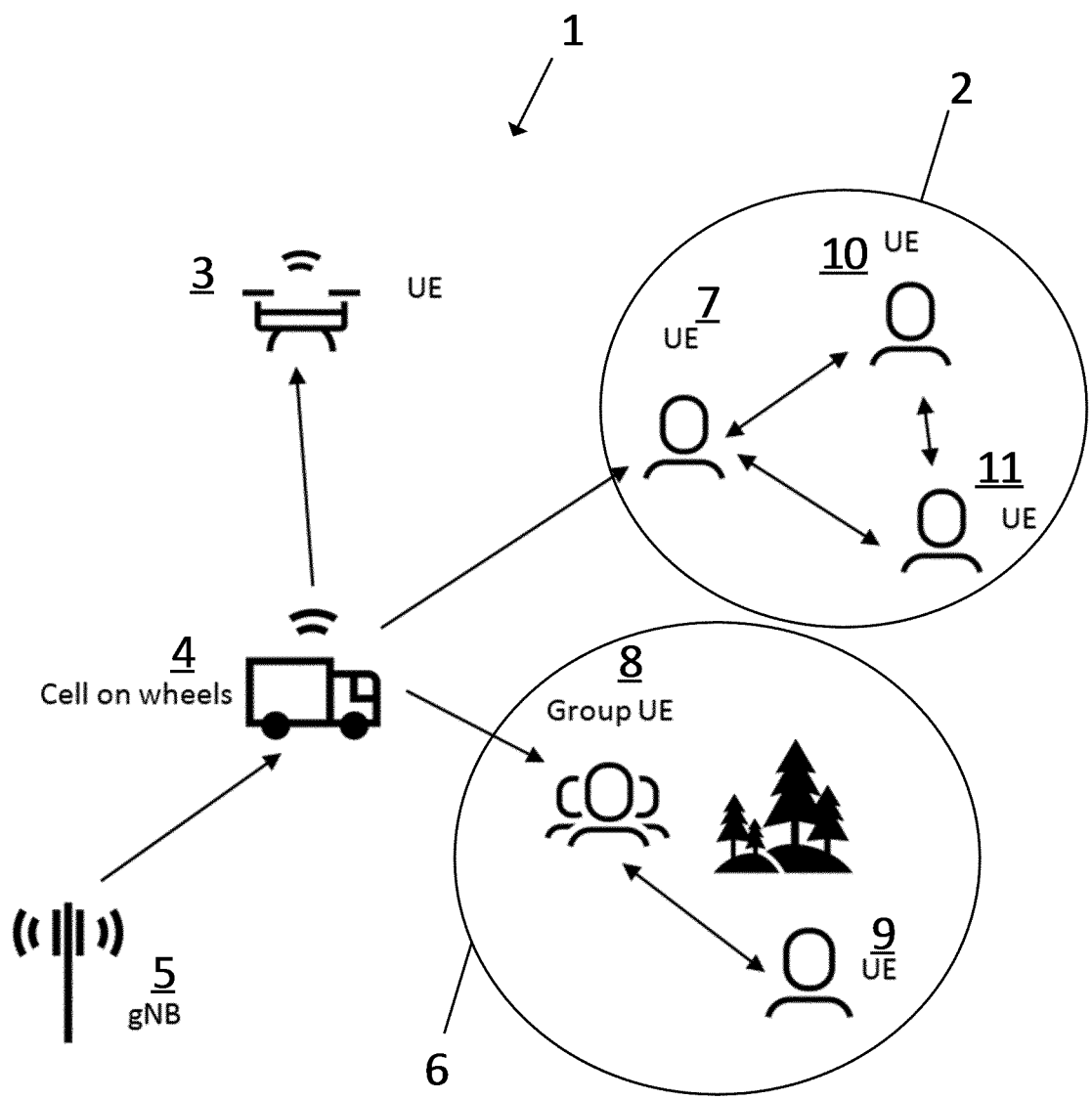
FIG. 1 discloses an example of an exemplary scenario including a plurality of User Equipment, UE's, in a telecommunication network.

FIG. 1 discloses an example scenario of including a plurality of User Equipment, UE's, in a telecommunication network.

The telecommunication network may comprise an access node 5, such that UE's are able to access the telecommunication network. The access node 5 is comprised by the Radio Access Network, RAN, which is used for connecting to the core network of the telecommunication network. The core network is not shown in FIG. 1.

It is noted that the present disclosure may be applicable for different types of networks, such as a fourth, 4G, Generation telecommunication network and a fifth, 5G, Generation telecommunication network. In a 4G telecommunication network, the access node 5 is often referred to as an eNodeB. In a 5G telecommunication network, the access node 5 is often referred to as a gNodeB.

In FIG. 1, a cell on wheels 4 is shown which is used for extending the coverage area of the particular access node 5. The cell on wheels 4 may, for example be a truck or anything alike. The cell on wheels 4 may act as a proxy for the access node 5, but may also operate as a standalone access node 4, depending on the situation. In an alternative scenario, the cell on wheels 4 may be implemented as a drone or any other temporary cell that may be deployed for extending the coverage area of the telecommunication network.

Three different groups of UEs are shown in FIG. 1, as indicated with reference numerals 2, 3 and 6. Reference numeral 2 shows a situation in which three UE's 7, 10, 11 are able to communicate to each other using Device-to-Device, D2D, communication, for example using a sidelink communication channel.

Device-to-Device, D2D, communication entails that the UE's directly communicate to each other thus without the intervention of an access node 2. Each of the UE's in the group as indicated with reference numeral 2 may be in reach by the cell on wheels 4, or not. The present disclosure is not limited to either scenario. The D2D communication between the UEs may be so-called duplex communication wherein the communication may occur in both directions of a particular UE, i.e. in the uplink towards another UE, or in a downlink originating from another UE.

Reference numeral 6 indicates a group of UEs as indicated with reference numeral 8, wherein each of the UEs in the group 8 are able to connect to the cell on wheels 4. That is, each of the UEs in the group 8 are located within the cell of the cell on wheels 4. The UE having reference numeral 9 is not in range of the cell on wheels 4 and not in range of the access nod 5. As such, the UE 9 may use any of the UEs in the group 8 as a proxy for connecting to the cell on wheels 4. This may be covered by the so-called ProSe mechanisms as described in the 5G telecommunication standard.

Finally, reference numeral 3 indicates that the UEs do not need to be limited to specific types of UEs like smartphones, smart watches, tablets or anything alike. It is envisioned that more and more Internet-of-Things, IoT, devices will emerge in the upcoming years that will have communication capabilities for connecting to other UEs in a D2D based communication and/or for directly connecting to an access station 5 or to a cell on wheels 4 or anything alike. It is noted that these types of UE's are also encompassed by the present disclosure.

The present disclosure is directed to resource selection of a particular UE, for example the one having reference numeral 7, wherein the UE 7 is provided with resource suggestions from the other UE's 10, 11 in its vicinity, i.e. the other UEs with which the UE 7 is able to communicate using D2D communications. This is explained in more detail with respect to FIG. 2.

Figure 2:
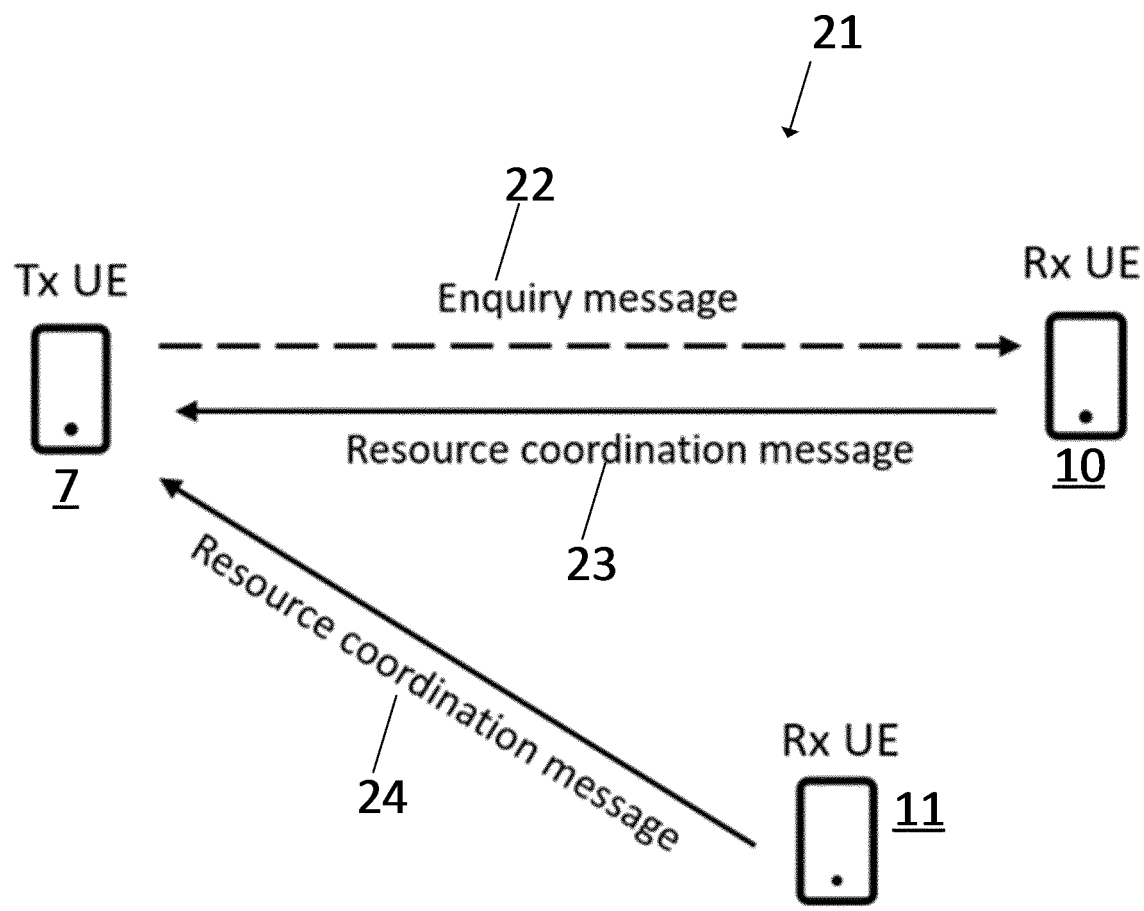
FIG. 2 discloses inter-UE resource coordination framework with and without an enquiry message.

FIG. 2 discloses inter-UE resource coordination framework with and without an enquiry message.

The present disclosure may be directed to the situation in which the UE 7 intends to initiate a transmission, but needs to select one or more resources for doing so.

One aspect of the present disclosure is that the UE 7 is to select one of multiple received suggested resources for the transmission based on trustworthiness values associated with the received suggest resources, i.e. associated with the UE from which the suggested resources originate. This is explained in more detail here below.

The selected resources may be used for D2D transmission, or may be used for transmission to an access node, or anything alike. The method for performing the resource selection for transmission is thus performed, in FIG. 2, by the UE having reference numeral 7.

In a first step, the UE 7, receives a resource coordination message 23 from the UE 10, and receives a resource coordination message 24 from the UE 11. Both using D2D based transmission. The resource coordination messages comprise a suggested resource that is to be used by the UE 7 for its transmission.

It is noted that the UE 10 and the UE 11 may not have negotiated before sending out the resource coordination messages. This means that the suggestions made in the resource coordination messages 23, 24 may not be tuned to one another, such that the suggestions may even be in conflict with each other. This is an undesired effect.

The inventors have found a solution in that the UE 7 determines trustworthiness values for each of the at least two UE 10, 11 separately, wherein the trustworthiness values indicate the trustworthiness of the corresponding UEs 10, 11.

The trustworthiness value may be introduced in the corresponding resource coordination message, may be received from the access node, or may be determined by the UE 7 itself. In the latter, the UE 7 may use all kinds of information for determining the trustworthiness, like Receiving Signal Strength Indicator, RSSI, timing aspects, etc.

Finally, the UE 7 selects one of the received suggested resources for said transmission based on said determines trustworthiness value for each of said at least two UE 10, 11 separately.

One of the aspects of the present disclosure is thus to introduce a trustworthiness value, i.e. information/metric, to the UEs 10, 11 providing resource suggestion, which may comprise a metric explicitly/implicitly associated to the resource suggestion itself so that the receiving UE 7 can make an informed decision for the resource selection, which leads to an increased network resource utilization efficiency. The trustworthiness value can be sent explicitly and/or associated/inferred implicitly.

The presented disclosure may have several advantages over the prior art.

First, coordination and trustworthiness in resource usage situation, and suggestion, allows receiving UEs 7 to make more informed decisions on utilizing radio resources leading to higher spectral efficiency, enhanced QoS and lower number of collisions or conflict, i.e. interference, situation.

Second, trustworthiness information sent explicitly allows receiving UEs 7 to rank and assess the significance of the resource usage suggestions from a sender UE 10, 11. This information from the sending UE 10, 11 may include both the temporal and spatial aspects.

Third, the trustworthiness of a UE 10, 11 suggesting the resource usage may be assessed based on the actual utilization of resources or trustworthiness based on the capability, role or the hierarchy of the UE 10, 11 sending the information. As non-limiting examples on the capability, a roadside-unit, RSU, in automotive use-cases, a cell on wheels in public safety use-cases, etc. can naturally be trusted more than other UEs 10, 11 due to their capability and role in the application. The trustworthiness of a UE suggesting the resource usage based on the role, capability or hierarchy thus allows building a more realistic picture on the resource utilization thereby leading to higher resource utilization efficiency.

It may be considered beneficial for product implementation and practical deployment to use coordination mechanisms among UEs in resource selection and suggestion. Some aspects of the scheme described can be implemented using the existing NR SL signaling, i.e., without introducing extra/specific signaling, and can be adopted in products.

In the present disclosure, a method to rank and select suggested resources, e.g., based on a trustworthiness information/metric from other UEs 10, 11 or associated to the resource signalling is defined. It may be beneficial to include explicit information or infer implicitly about the trustworthiness and decision making on following up the resource usage suggestions from other nodes.

The defined mechanism may be used within the framework of the inter-UE coordination and in the scenario of UE-to-UE relay where a UE can have a higher hierarchy in the network than other, e.g., road-side units in the case of vehicular communications. Therefore, the following examples are focused on these two scenarios. However, the present disclosure can be useful in other use-cases as well.

Even though it is focused on the 3GPP technology, like NR SL, and associated terminology, most of the examples are, in general, applicable to any kind of direct communications between UEs involving device-to-device, D2D, communications such as LTE SL or other IEEE based technologies. In this disclosure, the following mechanisms may be included which can be used individually or in any combination of them.

In one example, the trustworthiness value, i.e. metric, can be pre-defined for a certain type of UEs, e.g., master nodes in the network, or based on the UE capabilities, e.g., UEs with higher capabilities may have a higher trustworthiness ranking. For instance, a UE which is defined as master node or with a higher hierarchy in the network, e.g., cell-on-wheels as shown in FIG. 1, may have a higher trustworthiness score.

In a related example, the pre-configured trustworthiness value for a specific UE or group of UEs can be pre-defined only in a specific zone or for a certain resource pool associated with the zone.

In another example, the trustworthiness value can be configured based on RRC signalling, e.g., using RRC signalling the network node can configure a certain trustworthiness value for a specific UE or group of UEs, or using PC5-RRC signalling one UE or group of UEs can indicate a certain trustworthiness value to a UE or group of UEs.

In an even further example, within the inter-UE coordination framework or in any other related mechanism, the trustworthiness metric can be defined based on the following explicit information used for the setup of the coordination message, or any combination of them:

- based on the sensing interval, i.e., size of the sensing window.
- position of the node or signal strength levels with respect to the Rx UE;
- time when the spectrum sensing information is carried out with respect to the time of sending the information;
- device capability, e.g., a weighting factor from the source node, etc.

The UE receiving the resource usage suggestion can keep a weighting function for each node where different factors are incorporated following the following expression:

$$W_{UE} = \sum_{i=0}^{N} w_i^{F_i}$$

Here a receiving node may maintain a weighting function $W_{UE}$ corresponding to a given UE for certain resource utilization suggestion where $w_i$ is the weight of factor $F_i$. The summation of individual normalized weights $w_i = \{w_1, w_2, \ldots, w_N\}$ is upper bounded by a value $\leq 1$, i.e., the trustworthiness value $W_{UE}$ obtained using the weighting function is $W_{UE}=[0,1]$. As non-limiting example, the factors using in the function include the following parameters or any combination of them:

a) Proximity/location of the given UE. The value is large for close proximity.
b) Signal strength from the given UE. The value is large for higher signal strength
c) A metric to represent the capability and sensing accuracy at the given UE. The value is high when the UE has increased sensing capability, i.e., the value is based on the sensing window size.
d) A factor representing the inverse of the duration when the last update was received. A more recent update gets a higher value.
e) A factor indicating successful transmission (cf. utilization of radio resources) from the given UE.
f) Inverse of the occupancy of the radio resources. If the radio resources are less occupied, the factor has a high value.
g) Assigned hierarchy in the network of the UE (high hierarchy=2, normal hierarchy=1, low hierarchy=0) based on pre-configuration or configuration based on RRC parameter.

Implicitly a node may trust the information from a node in close vicinity more as it represents more closely the spectrum environment. Another aspect that influences the metric is the timing of the information, e.g., the most recent information naturally is more relevant than an older information.

From the receiver UE 7 side, i.e., the node receiving the coordination message, a mix of the above spatial and temporal aspects in addition to past trustworthiness of the resource suggestions from the particular nodes can be considered.

The receiving node 7 may keep an online process to compute the weighting function of different UEs sending the resource usage suggestions. The resource suggestion with highest weighting function is selected. When there is a situation that the previous UE with resource suggestion is to be replaced, a certain threshold is observed to avoid fast switching without yielding significant improvements. The switching criterion thus can be expressed as follows:

$$W_{UE_1} > W_{UE_2} + Th$$

$W_{UE_1}$ and $W_{UE_2}$ are the weighting functions based on the trustworthiness parameters for UE1 and UE2, respectively. Th is a (pre-)configurable threshold value used for switching the decision on the resource usage from one UE to another and avoiding constant (re-)selection, i.e., a hysteresis mechanism.

In another example, the resource suggestion/signalling has a higher value of trustworthiness if the credentials or a previous information exchange has happened before the transmission of the suggestion, e.g., in the enquiry-based mechanism shown in FIG. 2. This may lead to a higher overhead in the communication but for some applications where the information has to be reliable and the source is important, the overhead can be tolerable, e.g., in the case of unicast scenarios.

The explicit information regarding the trustworthiness score from one UE to another UE can be sent in broadcast, unicast or group-cast manner. The information can be sent as part of the RRC signaling, for example PC5 RRC, or MAC CE or PHY signalling.

In another example, the peer UEs in the network can share the trustworthiness score of the rest of UEs in the network using broadcast or groupcast or unicast. This information can be transmitted using MAC CE parameters or embedded in some other signalling/information, e.g., when the credentials or information is exchanged in the case of enquiry-based inter-UE coordination mechanism.

In another example, the information regarding the trustworthiness of a transmission/resource coordination message can be forward to other nodes, e.g., in a relay scheme, and it can include/keep the trustworthiness of the original sender and/or the trustworthiness score of the UE forwarding the transmission.

It is noted that RRC, PC5 signaling and MAC CE are one ways to implement this particular disclosure, i.e. the messages exchanged between the UE's, or between the UE and the base station.

Figure 3:
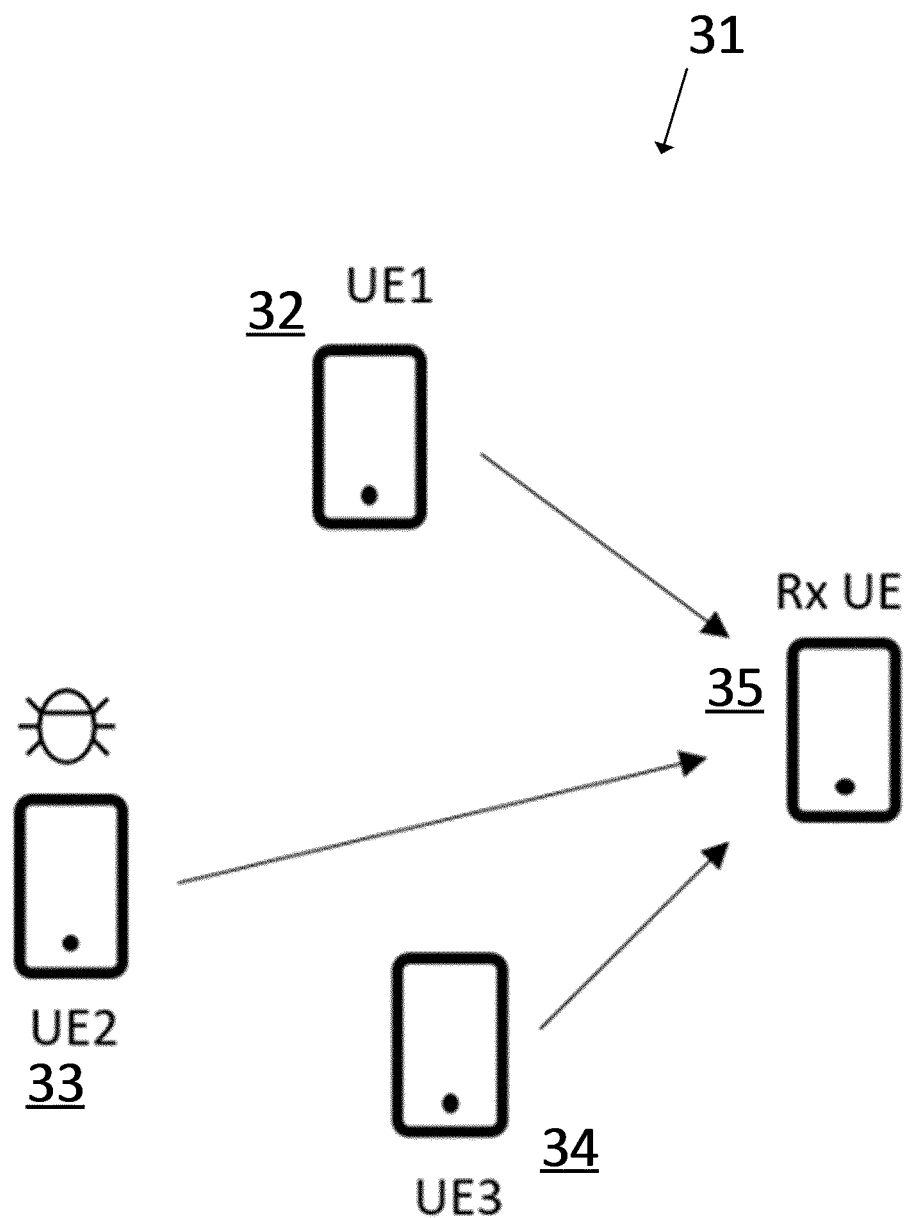
FIG. 3 discloses an exemplary scenario wherein a rogue UE sends a coordination message to the UE.

The second aspect that may be considered is the behavior of the UE 7 receiving the coordination messages based on the trustworthiness score of the UE 10, 11 or the associated coordination message. In the following scenario, as shown 31 in FIG. 3, there is a group of UEs 32, 33, 34 sending their coordination message to the Rx UE 35. In this case, one of the UEs 32, 33, 34 is labeled as rogue UE 33, i.e., the UE has a bug, and the Rx UE 35 may reject or ignore the coordination message from this specific UE 33.

In a related example, the rogue UE 33 can be identified by a peer UE or the network, for instance, if the resource suggestion provided by the UE has turned out to be causing interference/collisions one or more times during a predefined time period, i.e., the resource suggestion may have been harmful for the Rx UE.

In one example, the Rx UE may reject to participate in the coordination scheme with a particular UE 33 based on the trustworthiness value e.g., acute mistrust. For instance, upon receiving an enquiry to perform the resource coordination scheme the Rx UE 35 can ignore the enquiry message or release the connection in case of having a prior/existing connection established.

Figure 4:
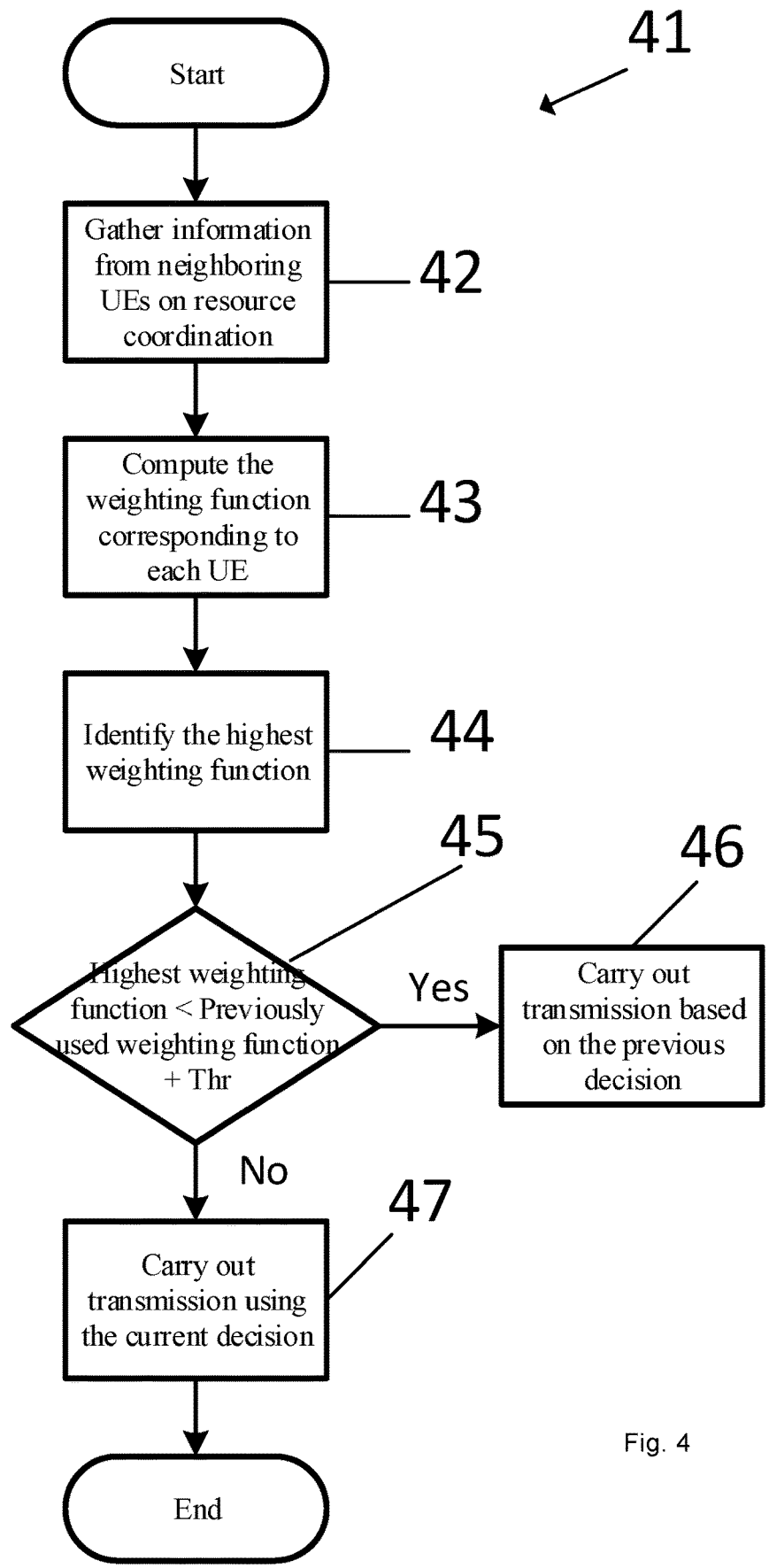
FIG. 4 discloses a flow chart in accordance with an example of the present disclosure.

A simplified flowchart for the method 41 is shown in FIG. 4, from the Rx UE perspective is shown performing the following steps or any combination or partial number of them:

A given UE gathers 42 resource usage suggestions and related meta information such as the capability, signal strength, location/proximity, etc. from neighboring nodes.

The receiving UE computes 43 the weighting function corresponding to each neighboring node that it has received the resource suggestion information.

In Step 44, the node identifies the resources to be used corresponding to the highest weighting function of the neighboring nodes.

In Step 45, a decision is based if the weighting function computed in step 43, 44 is smaller than the weighting function used in a previous resource selection round plus a certain configurable threshold Th.

If so, the resources are kept on used as in the previous round in step 46 otherwise a new resource selection is carried out in 47 based corresponding to the highest weighting function computed in 43, 44.

Other variations to the disclosed embodiments can be understood and effected by those skilled in the art in practicing the claimed invention, from a study of the drawings, the disclosure, and the appended claims. In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope thereof.

The invention claimed is:

1. A method for performing resource determination for transmission, by a User Equipment (UE) in a telecommunication network, wherein said method comprises the steps of:
   receiving, by said UE, from at least one UE in said telecommunication network, a resource coordination message in device-to-device (D2D) based transmissions, wherein said resource coordination message comprises a resource information to be taken into account by said UE when determining resources for transmission;
   determining, by said UE, a trustworthiness value for each of said at least one UE separately, wherein said trustworthiness value indicates a trustworthiness of a particular UE; and
   determining resources for said transmission based on said resource information and said determined trustworthiness value for each of said at least one UE separately, wherein said step of determining said trustworthiness value includes:
   calculating, by said UE, for each of said at least one UE said trustworthiness value by summing individual weights, wherein said individual weights are based on any of:
   proximity or location of a corresponding UE;
   signal strength from the corresponding UE;
   a metric to represent capability and/or sensing accuracy of the corresponding UE;
   a factor representing an inverse of a duration when a last resource coordination message of said corresponding UE was received;
   inverse of an occupancy rate of resources; and
   assigned hierarchy in said telecommunication network of said corresponding UE.

2. A method in accordance with claim 1, wherein predefined trustworthiness values are allocated based on different types of UEs, and wherein the step of determining comprises:
   determining, by said UE, said trustworthiness value for each of said at least one UE separately by determining a type of UE for each of the at least one UE separately.

3. A method in accordance with claim 1, wherein predefined trustworthiness values are allocated based on UE capabilities, and wherein the step of determining comprises:
   determining, by said UE, said trustworthiness value for each of said at least one UE separately by determining UE capabilities for each of the at least one UE separately.

4. A method in accordance with claim 1, wherein said step of determining comprises:
   receiving, by said UE, from a base station in said telecommunication network, predefined trustworthiness values for each of said at least one UE separately.

5. A method in accordance with claim 1, wherein said step of determining said trustworthiness value comprises determining said trustworthiness value for each of said at least one UE separately based on any of:
   a sensing interval used for determining said suggested resource to be used by said UE for said transmission;
   position of corresponding UE, received signal strength, beam direction and/or beam width associated with a corresponding received resource coordination message;
   time between spectrum sensing information used for determining said suggested resource to be used by said UE for said transmission and time of receiving said corresponding resource coordination message;
   UE capability; and
   role of said UE in said telecommunication network.

6. The method in accordance claim 1, wherein each resource coordination message comprises a suggested resource for use for said transmission, wherein said step of determining said resources for transmission comprises:
   selecting said one of said received suggested resources for said transmission by determining that said calculated trustworthiness value exceeds a current, a pre-defined, a configurable and/or an empirically determined, trustworthiness value.

7. A non-transitory computer readable medium having instructions stored thereon which, when executed by a User Equipment (UE) in a telecommunication network, cause said UE to implement a method in accordance with claim 1.

8. A User Equipment (UE) arranged for performing resource determination for transmission in a telecommunication network, wherein said UE comprises:

a processor configured to:
receive from at least one UE in said telecommunication network, resource coordination messages in device-to-device (D2D) based transmissions, wherein each resource coordination message comprises a resource information to be taken into account by said UE when determining resources for transmission;
determine a trustworthiness value for each of said at least one UE separately, wherein said trustworthiness value indicates a trustworthiness of a particular UE;
determine resources for said transmission based on said resource information and said determined trustworthiness value for each of said at least one UE separately; and
calculate for each of said at least one UE said trustworthiness value by summing individual weights, wherein said individual weights are based on any of:
proximity or location of a corresponding UE;
signal strength from the corresponding UE;
a metric to represent capability and/or sensing accuracy of the corresponding UE;
a factor representing an inverse of a duration when a last resource coordination message of said corresponding UE was received;
inverse of an occupancy rate of resources; and
assigned hierarchy in said telecommunication network of said corresponding UE.

9. A UE in accordance with claim 8, wherein predefined trustworthiness values are allocated based on different types of UEs, and wherein the processor is further configured to determine said trustworthiness value for each of said at least one UE separately by determining a type of UE for each of the at least one UE separately.

10. A UE in accordance with claim 8, wherein predefined trustworthiness values are allocated based on UE capabilities, and wherein the processor is further configured to determine said trustworthiness value for each of said at least one UE separately by determining UE capabilities for each of the at least one UE separately.

11. A UE in accordance with claim 8, wherein the processor is further configured to receive from a base station in said telecommunication network, predefined trustworthiness values for each of said at least one UE separately.

12. A UE in accordance with claim 8, wherein the processor is further configured to determine said trustworthiness value for each of said at least one UE separately based on any of:
a sensing interval used for determining said suggested resource to be used by said UE for said transmission;
position of corresponding UE, received signal strength, beam direction and/or beam width associated with a corresponding received resource coordination message;
time between spectrum sensing information used for determining said suggested resource to be used by said UE for said transmission and time of receiving said corresponding resource coordination message;
UE capability; and
role of said UE in said telecommunication network.

13. A UE in accordance with claim 8, wherein each resource coordination message comprises a suggested resource for use for said transmission, wherein the processor is further configured to:
select said one of said received suggested resources for said transmission by determining that said calculated trustworthiness value exceeds a current, a pre-defined, a configurable and/or an empirically determined, trustworthiness value.

* * * * *